United States Patent
Mitchell

(10) Patent No.: US 8,139,649 B2
(45) Date of Patent: Mar. 20, 2012

(54) RECURSIVE FILTERING A VIDEO IMAGE USING ACTIVITY MAPPING

(75) Inventor: Arthur Mitchell, Hampshire (GB)

(73) Assignee: Ericsson AB, Stockholm (SE)

( * ) Notice: Subject to any disclaimer, the term of this patent is extended or adjusted under 35 U.S.C. 154(b) by 1357 days.

(21) Appl. No.: 11/799,519

(22) Filed: May 2, 2007

(65) Prior Publication Data

US 2007/0280359 A1    Dec. 6, 2007

(30) Foreign Application Priority Data

Jun. 2, 2006 (GB) .................................. 0610967.2

(51) Int. Cl.
*H04N 11/04* (2006.01)

(52) U.S. Cl. .................................. 375/240.29
(58) Field of Classification Search ............... 375/240.29
See application file for complete search history.

(56) References Cited

U.S. PATENT DOCUMENTS

2005/0280739 A1 * 12/2005 Lin et al. ..................... 348/607

FOREIGN PATENT DOCUMENTS

| EP | 0961224 A1 | 12/1999 |
| EP | 1428394 A | 10/2002 |
| WO | WO 2006/010276 A1 | 2/2006 |

\* cited by examiner

*Primary Examiner* — Aravind Moorthy

(57) ABSTRACT

A method of recursive filtering a video image includes determining a local variance $\sigma^2$ in luminosity in the vicinity of a picture element on the image; making an estimate of a value of noise variance $\sigma_r^2$; obtaining a surface for value of a proportional parameter K from the equation $$K = \alpha \left[ \frac{\rho \cdot \lambda \cdot \sigma^2}{\rho \cdot \lambda \cdot \sigma^2 + \tau \cdot \sigma_r^2} \right] + \beta$$

where $1 \leq \sigma \leq 128$, $1 \leq \sigma_r \leq 64$ and $\rho$, $\tau$, $\alpha$, and $\beta$ are empirical constants, and selecting a value of $\lambda$ to scale a relative contribution to the value of K by the luminosity variance and the noise variance. The image is recursively filtered using the proportional parameter K to sum proportions of the current image and an immediately preceding image.

14 Claims, 2 Drawing Sheets

RECURSIVE FILTERING A VIDEO IMAGE USING ACTIVITY MAPPING

FIELD OF THE INVENTION

This invention relates to a method of recursive filtering a video image using activity mapping.

BACKGROUND OF THE INVENTION

It is known, from, for example BBC Research Department Report "Video noise reduction" BBC RD 1984/7 N. E. Tanton et al, July 1984, (Tanton) that random noise in a sequence of television or some other kinds of electronically generated images, e.g. scanned film, can be reduced by applying a recursive temporal filter which operates on each picture element, hereinafter abbreviated to 'pel'. It is beneficial to reduce noise levels prior to viewing images but also prior to processes that are sensitive to the presence of noise, especially compression systems such as those defined by, but not limited to, MPEG specifications. In practice, noise control is among several important and valuable techniques employed in pre-processing elements inherent in modern compression hardware and software realisations of specifications such as MPEG.

For each pel, indexed in the image by i, an output R(i) of a recursive filter is a sum of complementary proportions of a current image C(i) and a previous resultant output image S(i) such that the proportions of C(i) and S(i) in the output R(i) are controlled by means of a fractional parameter K. If this notation is extended with a suffix 'f' to denote the frame it is evident that the condition $S_f(i)=R_{f-1}(i)$ ensures a first order recursive temporal filter operation.

Hence, each pel in the result R(i) is expressed as:

$$R_f(i) = K \cdot C_f(i) + (1-K) \cdot S_f(i) \quad 0 \leq K \leq 1$$

Equation 1: Recursive noise reduction calculation

Where:

$C_f(i)$ is the current input image under operation; i is the index to individual pels of that image and f is the index to the sequence of complete images, $S_f(i)$ is a stored array of pels equal to the result $R_{f-1}(i)$ of the filter operation on the previous image and i is the index to individual pels of that image.

R(i) is the resulting pel field, which, after the operation, is copied to S(i) before the operation is performed on the next image in the sequence and i is the index to individual pels of that image.

It is expected in the filter calculations that the index i of each of R(i), C(i) and S(i) is the same so that the pels are spatially co-located in each respective image. The index of pels in each image, i, may be defined in more than one-dimension; conventionally it is convenient to use two, corresponding to the commonly-used raster scanning of television images. Thus $R_f(i)$ becomes $R_f(x,y)$. The index f corresponds to the frame or temporal dimension.

K is a fractional parameter that controls a proportion of the current image C(x,y) to previous image S(x,y) used to obtain the current result R(x,y). In the prior art, the parameter K does not change frequently with time, typically once per complete image, and in extreme cases may be fixed indefinitely at one value. The fractional parameter may also be operated under direct manual control. Experience shows that this is not satisfactory for some image material.

The value of K is used to control the degree of filtering (and hence noise attenuation) and that attenuation increases as K tends toward 0. At value K=0 there is no transmission of the incoming image C and the output is therefore "frozen". This is an ideal setting to process still images where the absence of motion allows optimal filtering for noise reduction. In the presence of motion, however, the setting of K=O is, in general, far from ideal. At K=1 there is no filtering at all and the output is identically equal to the input and no noise reduction is achieved.

This technique has some limitations. Objects in motion captured in successive images cause their respective pels to change position in the image and thus their index (x,y). Motion leads to changes in the position, i.e. lateral movement, or attitude, i.e. rotational movement, of recognisable objects in the image even when there is no camera movement. Changes in object position are also caused by camera movement such as panning or tilting, or both, and changes in object position and scale caused by zooming, i.e. changes in focal length of the camera lens. In all these cases the recursive filter described above will therefore add together pels in successive images whose indices (x,y) no longer correspond to the same part of such moving objects and consequently motion will be confused with noise and the filter will reduce the value of the differences between successive images caused by motion as if it were noise. As a result, viewed images tend to blur for small amounts of movement and larger motion tends to create ghosts of any moving objects substantially compromising the image with artefacts. The essence of the problem is an inability to discriminate reliably between noise and motion, in that small amounts of motion can be difficult to distinguish from noise.

To reduce unwanted artefacts, the value of K can be defined on a per pel basis, i.e. K(x,y), from information derived from the pel C(x,y) under operation and the surrounding pels. The value of K(x,y) can be derived from the temporal difference between co-located pels, however this produces artefacts because this local difference is a function both of the sought after motion and the noise in the image. To discriminate between noise and motion requires the measurement and the subsequent exploitation of differing statistical properties of the motion and the noise.

Reinhard Klette & Piero Zamperoni: Handbook of image processing operators. John Wiley & Sons Chichester, UK. August 1996. ISBN 0 471 95642 2 (Klette and Zamperoni) proposes a method for reducing noise in a single static image by operating dynamically across the image and producing an output image from a fraction of the "local average" of luminance pel intensity and the intensity of the collocated pel.

The fraction of the local average used is set by a function of what they describe as the "local variance", σ. In other words the degree of filtering is determined by the amount of local activity in the image. In areas where there is such activity the degree of filtering is reduced because noise is less visible than in inactive areas where visibility is greater.

Klette and Zamperoni define their operators as follows:

Calculation of local average $$\overline{F}(r,s) = \frac{1}{a} \sum_{i=-m}^{m} \sum_{j=-n}^{n} f(r-i, s-j)$$

Equation 2

This defines a local average of luminance intensity around a pel at index position (r,s) as the sum of luminance pels in an arbitrary window of 2m+1 by 2n+1 pels divided by 'a', the number of pels in the window and a=(2m+1).(2n+1).

Klette and Zamperoni also define σ(r,s), the local variance i.e. the mean of the squares of pel values, as:

Calculation of local variance $$\sigma(r, s) = \tilde{F}(r, s) = \frac{1}{a} \sum_{i=-m}^{m} \sum_{j=-n}^{n} [f(r-i, s-j) - \overline{F}(r,s)]^2 \quad \text{Equation 3}$$

The operation they describe reduces noise by softening the image toward the local mean of luminance values but this causes blurring and softening as artefacts.

Klette and Zamperoni further describe that the degree of softening applied to a pel (K) is defined by, Calculation of applied degree of filtering $$K = \frac{\sigma^2}{\sigma^2 + \sigma_r^2} \quad \text{Equation 4}$$

Where σ is a measured local variance from mean luminance level and $\sigma_r$ is an estimated value of the noise variance.

Expressed graphically as a surface, the calculation from Equation 4 is as illustrated in FIG. 1.

It is an object of the present invention at least to ameliorate the aforesaid shortcomings in the prior art.

It is another object of the present invention to provide means whereby discrimination between motion and noise may be improved.

It is a further object of this invention that the value of K may be varied pel-by-pel appropriately to reduce noise but also to suppress unwanted artefacts, so that K becomes K(x,y).

SUMMARY OF THE INVENTION

According to a first aspect of the present invention there is provided a method of recursive filtering a video image comprising the steps of: determining a local variance $\sigma^2$ in luminosity in the vicinity of a picture element on the image; selecting an estimated value of noise variance $\sigma_r^2$ indicative of characteristics of that noise; obtaining a surface for value of a proportional parameter K from an equation $$K = \alpha \left[ \frac{\rho \cdot \lambda \cdot \sigma^2}{\rho \cdot \lambda \cdot \sigma^2 + \tau \cdot \sigma_r^2} \right] + \beta,$$

where $1 \leq \sigma \leq 128$, $1 \leq \sigma_r \leq 64$ and ρ, τ, α and β are empirical constants; selecting a value of λ to scale a relative contribution to the value of K by the luminosity variance and the noise variance; and recursively filtering the image using the proportional parameter K to sum proportions of the current image and an immediately preceding image.

Conveniently, determining the local variance $\sigma^2$ in luminosity comprises determining a mean of squares of differences between picture elements values and a mean value of the luminosities of the picture elements in a predetermined vicinity of a picture element being processed.

Alternatively, determining the local variance $\sigma^2$ in luminosity comprises determining a positive root of a sum of squares of differences between picture elements values and a mean value of the luminosities of the picture elements in a predetermined vicinity of a picture element being processed.

Advantageously, the method further comprises selecting attenuation characteristics dependent on levels of motion and noise present in the image.

Conveniently, for an image containing substantially a same level of motion and noise, the method further comprises choosing a level of motion/noise measurement requiring a given degree of attenuation and using the attenuation curve to attenuate the required amount at the chosen level and progressively less above that level.

Conveniently, for an image containing a high level of motion, the method further comprises selecting a value of λ such that no filtering occurs above a determined degree of motion.

Conveniently, for an image containing infrequent high levels of noise, the method further comprises use a portion of the surface that is not normalised along the $\sigma_r$ axis so that some attenuation is applied whatever the level of motion in the image.

According to a second aspect of the invention, there is provided a recursive filter system for a video image comprising: calculating means arranged to determine a local variance $\sigma^2$ in luminosity in the vicinity of a picture element on the image; input means for inputting an estimate of a value of noise variance $\sigma_r^2$ indicative of characteristics of that noise; processing means arranged to obtain a surface for values of a proportional parameter K from an equation $$K = \alpha \left[ \frac{\rho \cdot \lambda \cdot \sigma^2}{\rho \cdot \lambda \cdot \sigma^2 + \tau \cdot \sigma_r^2} \right] + \beta,$$

where $1 \leq \sigma \leq 128$, $1 \leq \sigma_r \leq 64$ and ρ, τ; α and β are empirical constants; selection means arranged to permit selection of a value of λ to scale a relative contribution to the value of the proportional parameter K by the luminosity variance and the noise variance; and a recursive filter arranged to filter the image using the proportional parameter K to sum proportions of the current image and an immediately preceding image.

Conveniently, the calculating means is arranged to determine a mean of squares of differences between picture elements values and a mean value of the luminosities of the picture elements in a predetermined vicinity of a picture element being processed. Alternatively, the calculating means is arranged to determine the local variance $\sigma^2$ in luminosity by determining a positive root of a sum of squares of differences between picture elements values and a mean value of the luminosities of the picture elements in a predetermined vicinity of a picture element being processed.

Conveniently, the recursive filter system further comprises input means for inputting attenuation characteristics selected dependent on levels of motion and noise present in the image.

Conveniently, for an image containing substantially a same level of motion and noise, the recursive filter system further comprises input means arranged to allow choice of a level of motion/noise measurement requiring a given degree of attenuation and arranged to use the attenuation curve to attenuate the required amount at the chosen level and progressively less above that level.

Conveniently, for an image containing a high level of motion, the recursive filter system comprises input means for inputting a value of λ such that no filtering occurs above a determined degree of motion.

Conveniently, for an image containing infrequent high levels of noise, the recursive filter system comprises means for selecting a portion of the surface that is not normalised along the $\sigma_r$ axis so that some attenuation is applied whatever the level of motion in the image.

According to a third aspect of the invention, there is provided a computer program comprising code means for performing all the steps of the method described above when the program is run on one or more computers.

BRIEF DESCRIPTION OF THE DRAWINGS

The invention will now be described, by way of example, with reference to the accompanying drawings in which.

In the Figures like reference numerals denote like parts.

DETAILED DESCRIPTION OF EMBODIMENTS

The approach of Klette and Zamperoni is suitable for still images but has the disadvantage of causing excessive localised softening and other artefacts when applied to moving image sequences. Their approach also fails to address the benefit to be gained by using the temporal redundancy available in a sequence of frames.

The principle of recursive filtering of Tanton is sometimes used in motion video but even if the degree of filtering is varied it still may not attenuate the noise effectively while leaving the motion unaffected.

For recursive filtering an image is stored, step 31, for comparison with a current image which is subsequently input, step 32.

By taking elements from Klette and Zamperoni and replacing the "localised variance from mean luminance level" with a measure of motion, a profile of attenuation can be found that is designed to act on the noise more effectively and avoid introducing artefacts in the motion. It is further advantageous to scale the degree of motion by a coefficient, $\lambda$, to make a best utilisation of the attenuation curves, as discussed herein below.

The prior art formula from Equation 4 is sub-optimal for processing motion video for several reasons; first the surface deviates from unity as $\sigma_r$ increases. This means that the degree of attenuation is greater than zero for large degrees of motion. Secondly it is inappropriate to allow K to tend to zero since this would result in significant visual impairment to small motion and level changes. For better noise attenuation it is also necessary to scale and select an appropriate section of the surface.

Hence, for moving images, according to the invention, the formula from Equation 4 is modified to be:

Modified calculation of applied degree of filtering $$K = \alpha \left[ \frac{\rho \cdot \lambda \cdot \sigma^2}{\rho \cdot \lambda \cdot \sigma^2 + \tau \cdot \sigma_r^2} \right] + \beta \qquad \text{Equation 5}$$

where
$1 \leq \sigma \leq 128$,
$1 \leq \sigma_r \leq 64$
and $\rho, \tau, \alpha$ and $\beta$ are empirical constants.

Suitable values of the empirical constants are found to be $\rho=0.4, \tau=1, \alpha=0.9$ and $\beta=0.1$.

By altering the segment of the surface in use (by varying values of $\rho$ and $\tau$) and normalising along the a axis, $\sigma$ more suitable range of K can be chosen. The values of $\rho, \tau, \alpha$ and $\beta$ given above are purely exemplary. Values are chosen to provide a full range of attenuation options over the $\sigma$ axis and $\sigma_r$ axis and as such are chosen empirically.

Normalising the surface means that for larger $\sigma$ values, K tends to 1, which prevents ghosting on larger motion.

The coefficients $\alpha$ and $\beta$ scale the surface, bounding the maximum attenuation and preventing artefacts that might be unsightly.

Figure 1:
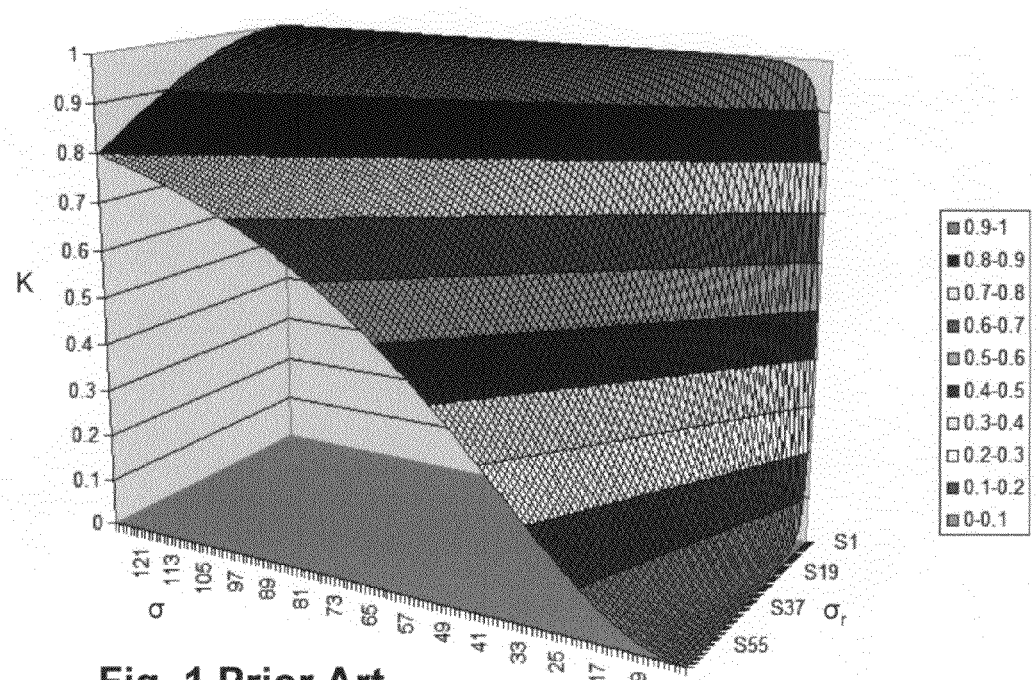
FIG. 1 is a graph according to the prior art of a surface, from Equation 4, representing a value of a proportional parameter used in recursive filtering.
Figure 2:
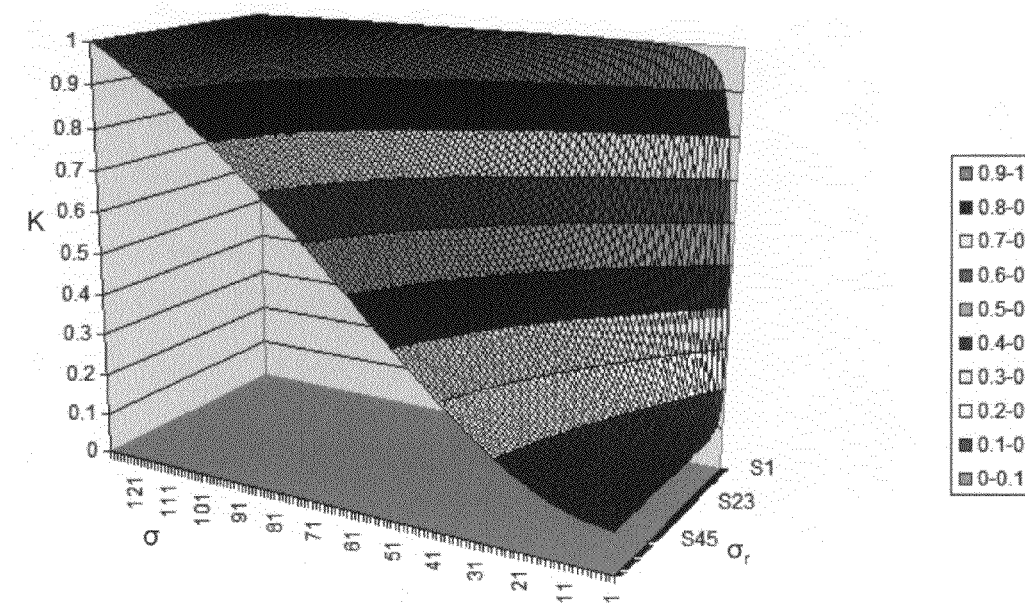
FIG. 2: is a graph of a surface, from Equation 5, representing a value of a proportional parameter used in recursive filtering according to the invention.
Figure 3:
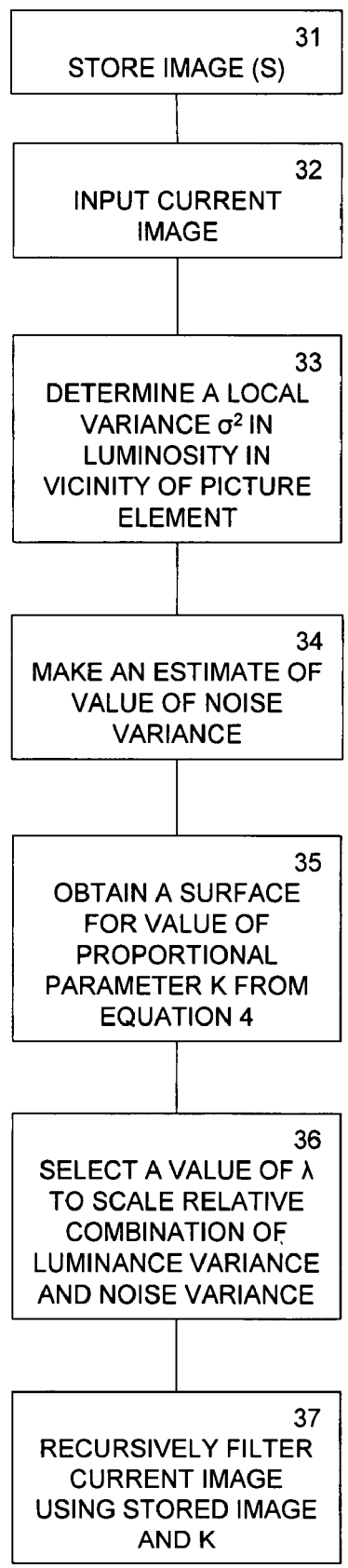
FIG. 3 is a flowchart of a method according to the apparatus.

In order to apply the equation, a local variance of luminosity in a vicinity of a picture element being processed is determined, step 33, as an estimate of the degree of motion, and an estimate of noise variance $\sigma_r^2$ in the vicinity is made, step 34. It will be understood that $\sigma_r$ is not only an estimate of the noise variance but also an indication of characteristics of that noise. A choice is made of an attenuation profile from those available, based on characteristics of the noise present. If the axis numbered from 1 to 128 in FIG. 2 is mapped to the estimated degree of motion then the axis labelled S1 to S64 is used to map $\sigma_r$ (the chosen profile of attenuation). The vertical axis ranging from 0 to 1 is K, where K=1 represents no filtering applied to the image, so that a surface for values of K is obtained, step 35.

Optimal Use of Mapping Curves

Once this system is implemented the attenuation characteristics can be manipulated to suit the image and the noise present.

Examples of such strategies are:

1. Choose, step 36, a level of motion/noise measurement requiring a given degree of attenuation and use the attenuation curve to attenuate, step 37, the chosen amount at that level and to a progressively smaller degree above this to catch the remainder of a wide noise distribution. This strategy is ideal for images where the degree of motion and the noise floor overlap due to either low motion and noise or higher motion and high noise.
2. Choose a degree of motion above which filtering is not desired and scale $\sigma$ with $\lambda$ so that this value sits at the furthest end of the curve. This is useful for fast, large motion such as sport that would otherwise suffer blurring from the recursive algorithm. This method also draws on psycho-visual models of the human visual system that reveal insensitivity to noise on fast moving objects.
3. For material suffering large level noise on an infrequent basis it would be appropriate to use a section of the curve that is not normalised along the $\sigma_r$ axis. This would mean that a degree of attenuation would be applied no matter what the measured motion is. This would apply to source images which have suffered mechanically or chemically during storage resulting in physical defects such as acetate flaws.

Alternative embodiments of the invention can be implemented as a computer program product for use with a computer system, the computer program product being, for example, a series of computer instructions stored on a tangible data recording medium, such as a diskette, CD-ROM, ROM, or fixed disk. The series of computer instructions can constitute all or part of the functionality described above, and can also be stored in any memory device, volatile or non-volatile, such as semiconductor, magnetic, optical or other memory device.

Although the present invention has been described with reference to preferred embodiments, workers skilled in the art will recognize that changes may be made in form and detail without departing from the spirit and scope of the invention.

I claim:

1. A method of recursive filtering a video image comprising the steps of:
   a. determining, using a computer system, a local variance $\sigma^2$ in luminosity in the vicinity of a picture element on the image;
   b. selecting, using the computer system, an estimated value of noise variance $\sigma_r^2$ indicative of characteristics of that noise;
   c. obtaining, using the computer system, a surface for value of a proportional parameter K from the equation $$K = \alpha \left[ \frac{\rho \cdot \lambda \cdot \sigma^2}{\rho \cdot \lambda \cdot \sigma^2 + \tau \cdot \sigma_r^2} \right] + \beta$$

where
   $1 \leq \sigma \leq 128$,
   $1 \leq \sigma_r \leq 64$
   and $\rho$, $\tau$, $\alpha$ and $\beta$ are empirical constants;
   d. electing, using the computer system, a value of $\lambda$ to scale a relative contribution to the value of the proportional parameter K by the luminosity variance and the noise variance; and
   e. recursively filtering, using the computer system, the image using the proportional parameter K to sum proportions of the current image and an immediately preceding image.

2. A method as claimed in claim 1, wherein determining the local variance $\sigma^2$ in luminosity comprises determining, using the computer system, a mean of squares of differences between picture elements values and a mean value of the luminosities of the picture elements in a predetermined vicinity of a picture element being processed.

3. A method as claimed in claim 1, wherein determining the local variance $\sigma^2$ in luminosity comprises determining, using the computer system, a positive root of a sum of squares of differences between picture elements values and a mean value of the luminosities of the picture elements in a predetermined vicinity of a picture element being processed.

4. A method as claimed in claim 1, further comprising selecting, using the computer system, attenuation characteristics dependent on levels of motion and noise present in the image.

5. A method as claimed in claim 4, for an image containing a same level of motion and noise, further comprising choosing, using the computer system, a level of motion/noise measurement requiring a given degree of attenuation and using the attenuation curve to attenuate the required amount at the chosen level and progressively less above that level.

6. A method as claimed in claim 4, for an image containing a high level of motion, comprising selecting, using the computer system, a value of $\lambda$ such that no filtering occurs above a determined degree of motion.

7. A method as claimed in claim 4, for an image containing infrequent high levels of noise, comprising using a portion of the surface that is not normalised along the $\sigma_r$ axis so that some attenuation is applied whatever the level of motion in the image.

8. A recursive filter system for a video image comprising a non-transitory computer-readable storage medium including computer-readable instructions, when executed by a computer system, are configured to:
   a. determine a local variance $\sigma^2$ in luminosity in the vicinity of a picture element on the image;
   b. imput an estimate of a value of noise variance $\sigma_r^2$ indicative of characteristics of that noise;
   c. obtain a surface for value of a proportional parameter K from the equation $$K = \alpha \left[ \frac{\rho \cdot \lambda \cdot \sigma^2}{\rho \cdot \lambda \cdot \sigma^2 + \tau \cdot \sigma_r^2} \right] + \beta$$

where
   $\leq \sigma \leq 128$,
   $1 \leq \sigma' \leq 64$
   and $\rho$, $\tau$, $\alpha$ and $\beta$ are empirical constants;
   d. permit selection of a value of $\lambda$ to scale a relative contribution to the value of K by the luminosity variance and the noise variance; and
   e. filter the image using the proportional parameter K to sum proportions of the current image and an immediately preceding image.

9. A recursive filter system as claimed in claim 8, wherein the computer-readable instructions, when executed by the computer system, are further configured to determine a mean of squares of differences between picture elements values and a mean value of the luminosities of the picture elements in a predetermined vicinity of a picture element being processed.

10. A recursive filter system as claimed in claim 8, wherein the computer-readable instructions, when executed by the computer system, are further configured to determine the local variance $\sigma^2$ in luminosity by determining a positive root of a sum of squares of differences between picture elements values and a mean value of the luminosities of the picture elements in a predetermined vicinity of a picture element being processed.

11. A recursive filter system as claimed in claim 10, for an image containing a same level of motion and noise, further comprising means arranged to allow choice of a level of motion/noise measurement requiring a given degree of attenuation and to use the attenuation curve to attenuate the required amount at the chosen level and progressively less above that level.

12. A recursive filter system as claimed in claim 10, for an image containing a high level of motion, the computer-readable instructions, when executed by the computer system, are further configured to input a value of $\lambda$ such that no filtering occurs above a determined degree of motion.

13. A recursive filter system as claimed in claim 10, for an image containing infrequent high levels of noise, the computer-readable instructions, when executed by the computer system, are further configured to select a portion of the surface that is not normalised along the $\sigma_r$ axis so that some attenuation is applied whatever the level of motion in the image.

14. A recursive filter system as claimed in claim 8, wherein the computer-readable instructions, when executed by the computer system, are further configured to input attenuation characteristics selected dependent on levels of motion and noise present in the image.

* * * * *

UNITED STATES PATENT AND TRADEMARK OFFICE
CERTIFICATE OF CORRECTION

PATENT NO.       : 8,139,649 B2
APPLICATION NO.  : 11/799519
DATED            : March 20, 2012
INVENTOR(S)      : Mitchell Page 1 of 1

It is certified that error appears in the above-identified patent and that said Letters Patent is hereby corrected as shown below:

In Column 1, Line 41, delete "images," and insert -- images. --, therefor.

In Column 2, Line 4, delete "K=O" and insert -- K=0 --, therefor.

In Column 2, Line 42, delete "Kiette" and insert -- Klette --, therefor.

In Column 4, Line 34, delete "τ;" and insert -- τ, --, therefor.

In Column 4, Lines 46-51, delete "Alternatively, .... Processed." and insert the same as a new paragraph at Line 47.

In Column 5, Line 16, delete "FIG. 2:" and insert -- FIG. 2 --, therefor.

In Column 6, Line 4, delete "a axis, σ more" and insert -- σ axis, a more --, therefor.

In Column 8, Line 7, in Claim 8, delete "imput" and insert -- input --, therefor.

In Column 8, Line 17, in Claim 8, delete "≤σ≤128," and insert -- 1≤σ≤128, --, therefor.

In Column 8, Line 18, in Claim 8, delete "1≤σ$^r$≤64" and insert -- 1≤σ$_r$≤64 --, therefor.

Signed and Sealed this
Nineteenth Day of June, 2012

David J. Kappos
*Director of the United States Patent and Trademark Office*